United States Patent
Grunwald et al.

(10) Patent No.: US 8,627,331 B1
(45) Date of Patent: Jan. 7, 2014

(54) MULTI-LEVEL PARALLELISM OF PROCESS EXECUTION IN A MUTUAL EXCLUSION DOMAIN OF A PROCESSING SYSTEM

(75) Inventors: David Grunwald, Santa Clara, CA (US); Jeffrey S. Kimmel, Chapel Hill, NC (US)

(73) Assignee: NetApp, Inc., Sunnyvale, CA (US)

( * ) Notice: Subject to any disclaimer, the term of this patent is extended or adjusted under 35 U.S.C. 154(b) by 866 days.

(21) Appl. No.: 12/771,988

(22) Filed: Apr. 30, 2010

(51) Int. Cl.
*G06F 9/46* (2006.01)

(52) U.S. Cl.
USPC .......................................................... 718/106

(58) Field of Classification Search
USPC .......................................................... 718/106
See application file for complete search history.

(56) References Cited

U.S. PATENT DOCUMENTS

| | | | |
|---|---|---|---|
| 4,333,144 A | 6/1982 | Whiteside et al. |
| 4,459,664 A | 7/1984 | Pottier et al. |
| 4,488,231 A | 12/1984 | Yu et al. |
| 4,494,188 A | 1/1985 | Nakane et al. |
| 4,742,447 A | 5/1988 | Duvall et al. |
| 4,745,450 A | 5/1988 | Hartranft et al. |
| 4,785,382 A | 11/1988 | Fukura et al. |
| 4,875,159 A | 10/1989 | Cary et al. |
| 4,914,583 A | 4/1990 | Weisshaar et al. |
| 5,043,873 A | 8/1991 | Muramatsu et al. |
| 5,253,359 A | 10/1993 | Spix et al. |
| 5,280,614 A | 1/1994 | Munroe et al. |
| 5,297,265 A | 3/1994 | Frank et al. |
| 5,307,483 A | 4/1994 | Knipfer et al. |
| 5,327,556 A | 7/1994 | Mohan et al. |
| 5,357,612 A | 10/1994 | Alaiwan |
| 5,454,095 A | 9/1995 | Kraemer et al. |
| 5,481,706 A | 1/1996 | Peek |
| 5,481,747 A | 1/1996 | Kametani |
| 5,483,641 A | 1/1996 | Jones et al. |
| 5,502,840 A | 3/1996 | Barton |
| 5,513,314 A | 4/1996 | Kandasamy et al. |
| 5,590,326 A | 12/1996 | Manabe |
| 5,644,709 A | 7/1997 | Austin |
| 5,782,909 A | 7/1998 | Quiachon et al. |
| 5,790,851 A | 8/1998 | Frank et al. |
| 5,815,727 A | 9/1998 | Motomura |
| 5,826,081 A | 10/1998 | Zolnowsky |
| 5,857,180 A | 1/1999 | Hallmark et al. |
| 5,894,555 A | 4/1999 | Harada et al. |
| 5,931,938 A | 8/1999 | Drogichen et al. |
| 5,940,828 A | 8/1999 | Anaya et al. |

(Continued)

FOREIGN PATENT DOCUMENTS

| DE | 69425658 T2 | 4/2001 |
|---|---|---|
| EP | 0145889 A2 | 6/1985 |

(Continued)

OTHER PUBLICATIONS

Co-pending U.S. Appl. No. 11/255,859, filed Oct. 20, 2006.

(Continued)

*Primary Examiner* — Andy Ho
*Assistant Examiner* — Timothy A Mudrick
(74) *Attorney, Agent, or Firm* — Perkins Coie LLP (57) ABSTRACT

A technique is described for improving throughput in a processing system, such as a network storage server. The technique provides multiple levels (e.g., a hierarchy) of parallelism of process execution within a single mutual exclusion domain, in a manner which allows certain operations on metadata to be parallelized as well as certain operations on user data. The specific parallelization scheme used in any given embodiment is based at least partly on the underlying metadata structures used by the processing system. Consequently, a high degree of parallelization possible, which improves the throughput of the processing system.

36 Claims, 8 Drawing Sheets

(56) References Cited

U.S. PATENT DOCUMENTS

| | | | |
|---|---|---|---|
| 5,963,962 | A | 10/1999 | Hitz et al. |
| 6,105,053 | A | 8/2000 | Kimmel et al. |
| 6,151,618 | A | 11/2000 | Wahbe et al. |
| 6,269,390 | B1 | 7/2001 | Boland |
| 6,289,369 | B1 | 9/2001 | Sundaresan |
| 6,345,240 | B1 | 2/2002 | Havens |
| 6,366,945 | B1 | 4/2002 | Fong et al. |
| 6,378,066 | B1 | 4/2002 | Lewis |
| 6,434,631 | B1 | 8/2002 | Bruno et al. |
| 6,471,375 | B2 | 10/2002 | Kobayashi et al. |
| 6,502,122 | B1 | 12/2002 | Takeuchi |
| 6,546,546 | B1 | 4/2003 | Van Doorn |
| 6,604,123 | B1 | 8/2003 | Bruno et al. |
| 6,622,155 | B1 | 9/2003 | Haddon et al. |
| 6,658,449 | B1 | 12/2003 | Brenner et al. |
| 6,662,252 | B1 | 12/2003 | Marshall et al. |
| 6,691,166 | B1 | 2/2004 | Gasior et al. |
| 6,714,960 | B1 | 3/2004 | Bitar et al. |
| 6,728,959 | B1 | 4/2004 | Merkey |
| 6,745,222 | B1 | 6/2004 | Jones et al. |
| 6,779,182 | B1 | 8/2004 | Zolnowsky |
| 6,801,943 | B1 | 10/2004 | Pavan et al. |
| 6,850,947 | B1 | 2/2005 | Lim et al. |
| 7,123,247 | B2 | 10/2006 | Morita |
| 7,178,137 | B1 | 2/2007 | Peak et al. |
| 7,213,247 | B1 | 5/2007 | Wilner et |
| 7,290,260 | B2 | 10/2007 | Miller |
| 7,337,442 | B2 | 2/2008 | VoBa et al. |
| 7,404,067 | B2 | 7/2008 | Aamodt et al. |
| 7,694,302 | B1 | 4/2010 | Rajan et al. |
| 8,347,293 | B2 | 1/2013 | Lango et al. |
| 2001/0036181 | A1 | 11/2001 | Rogers |
| 2001/0037408 | A1 | 11/2001 | Thrift et al. |
| 2001/0037450 | A1 | 11/2001 | Metlitski et al. |
| 2001/0042139 | A1 | 11/2001 | Jeffords et al. |
| 2002/0026342 | A1 | 2/2002 | Lane et al. |
| 2002/0078119 | A1 | 6/2002 | Brenner et al. |
| 2002/0091748 | A1 | 7/2002 | Rehg et al. |
| 2004/0117531 | A1 | 6/2004 | McKenney |
| 2005/0172293 | A1 | 8/2005 | Petruncola et al. |
| 2007/0094529 | A1 | 4/2007 | Lango et al. |

FOREIGN PATENT DOCUMENTS

| | | | |
|---|---|---|---|
| JP | 2001167060 | A | 6/2001 |
| WO | WO-94/29807 | A1 | 12/1994 |
| WO | 0702815 | B1 | 3/1996 |
| WO | WO-02/12839 | A2 | 2/2002 |

OTHER PUBLICATIONS

Non-Final Office Action Mailed Nov. 25, 2009 in Co-Pending U.S. Appl. No. 11/266,859, filed Oct. 20, 2005.

Britton, D.E., et al., "An Interprocess Communication Facility for Distributed Applications," RCE Laboratories, David Sarnoff Research Center; Princeton, NJ, IEEE 1980, pp. 590-595.

Cheriton, D.R., "Multi-Process Structuring and the Thoth Operating System," Development of Computer Science; University of British Columbia, Vancouver, B.C., Canada, Mar. 1979 (68 pages).

Cheriton, D.R., et al., "Thoth, A Portable Real-Time Operating System," vol. 22, Feb. 1979, pp. 105-115, Operations Systems, Communications of the ACM, University of Waterloo.

Cheriton, D.R., "The Thoth System: Multi-Process Structuring and Portability," North-Holland, Operating and Programming Systems Series 8—The Computer Science Library, Elsevier Science Publishing Co., Inc., 1982, 18 pgs.

Feitelson, D.G., et al., "Parallel Job Scheduling: Issues and Approaches," Lecture Notes in Computer Science, vol. 949, Proceedings of the Workshop on Job Scheduling Strategies for Parallel Processing, 1995, pp. 1-18.

IAIA-32 Intel Architecture Software Developer's Manual, vol. 3: System Programming Guide 2004, 26 pgs. Intel Corporation.

Jones, A.K., et al., "StarOS, a Multiprocessor Operating System for the Support of Task Forces," Department of Computer Science Carnegie-Mellon University, Pittsburg, PA,, 1979, pp. 117-127.

Joukov, N., et al., "Increasing Distributed Storage Survivability With a Stackable RAID-like File System," Cluster Computing and Grid, 2005. CCGRID 2005, IDDD International Symposium on Cardiff, Wales, UK, May 9-12, 2006, Piscataway, NJ, USA, IEEE May 9, 2006, pp. 82-89.

Lantz, K.A., et al., "Rochester's Intelligent Gateway," IEEE, Oct. 1982, pp. 54-68.

Malcolm, M.A., "A Process Abstraction and Its Application," Department of Computer Science, University of Waterloo, Waterloo, Ontario, Proc. Eighth Manitoba Conference on Numerical Math and Computing, 1978, pp. 33-50.

Nelson, B., et al., "The Myth of Transfer Rate-How and Why SCSI is Better than IP1 for NFS," Technical Report 6, Second Edition-Auspex, Jul. 1992, 32 pgs.

Powell, M.L., et al., "Process Migration in DEMOS/MP," ACM SIGOPS Operating Systems Review, vol. 17, No. 6, Oct. 1983, pp. 110-119.

Slashdot: Tux2: "The Filesystem that would be King," Microsoft Internet Explorer, Oct. 20, 2000, pp. 1-16.

Xiong, J., et al., "Design and Performance of the Dawning Cluster File System," Cluster Computing 2003, Proceedings of IEEE International Conference on Dec. 1-3, 2003, Piscataway, NJ, USA, IEEE, Dec. 1, 2003, pp. 1-8.

Final Office Action Mailed Jun. 8, 2010 in Co-Pending U.S. Appl. No. 11/255,869, filed Oct. 20, 2006.

Final Office Action Mailed Apr. 1, 2011 in Co-Pending U.S. Appl. No. 11/255,859, filed Oct. 20, 2005.

Notice of Allowance Mailed Aug. 29, 2012 in Co-Pending U.S. Appl. No. 11/255,859 of Lango, J.A., et al. filed Oct. 20, 2005.

Non-Final Office Action Mailed Oct. 26, 2010 in Co-Pending U.S. Appl. No. 11/255,859 of Lango, J.A., et al., filed Oct. 20, 2005.

MULTI-LEVEL PARALLELISM OF PROCESS EXECUTION IN A MUTUAL EXCLUSION DOMAIN OF A PROCESSING SYSTEM

FIELD OF THE INVENTION

At least one embodiment of the present invention pertains to network storage systems, and more particularly, to providing multiple levels of parallelism of process execution in a mutual exclusion domain of a processing system, such as a network storage server.

BACKGROUND

Figure 1:
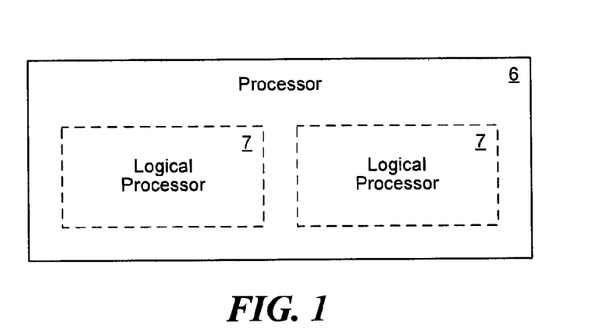
FIG. 1 illustrates a physical processor that includes multiple logical processors.

Multi-processor computing systems are becoming increasingly more common in a variety of applications. A multi-processor system is one which includes multiple processors, where the processors can be physical processors, logical processors, or a combination thereof. A single physical processor can implement multiple logical processors, as illustrated in FIG. 1, in which one physical processor 6 includes two logical processors 7. In such an implementation, the logical processors generally have some private state, but a portion of the state is shared. Henceforth in this document, the term "processor" is intended to mean either a physical processor or a logical processor unless the term is otherwise qualified.

It is important to ensure that instructions and data are safe for execution in a multi-processor environment. What is meant by "safe" in this context is that processes running concurrently will not operate on the same data, or if they do, they will be synchronized to avoid conflicting with each other. To ensure that instructions and data are multi-processor safe, the various processes implemented by the operating system can be organized into a number of mutual exclusion domains according to their functionality. A "mutual exclusion domain" in this context is a set of one or more processes and is sometimes called a "mutex". The mutual exclusion domains are defined according to functionality, so that it is not possible for two processes in different domains to operate on the same data simultaneously. Furthermore, generally only one process can execute at a time in each domain (with a few exceptions for operations that are inherently multi-processor safe).

A technique for defining and using mutual exclusion domains is known to have been implemented in network storage servers in the prior art. In that technique, the mutual exclusion domains are organized according to the critical path pipeline of the storage server. The critical path can be described as follows: When the storage server receives a data access request (read or write) from a client over a network, a network element of the storage server sends an appropriate message to the storage server's filesystem (storage manager element), which processes the message to determine where the corresponding data is stored, and which then forwards a corresponding message to a RAID element of the storage server. (Note that a "filesystem", as the term is used herein, does not necessarily manage data as "files" per se; for example, a filesystem can manage data in units of LUNs and/or individual data blocks, rather than files.) Each of these phases of processing the request is carried out by a different stage in the pipeline; as such, a separate mutual exclusion domain can be created for each stage, e.g., a domain for all network-specific processes of the storage server, a domain for all filesystem-related processes of the storage server, a domain for all storage-specific processes of the storage server, etc.

In certain network storage servers, the different pipeline stages, and hence, the corresponding mutual exclusion domains, tend to have different degrees of processor utilization. For example, in certain network storage servers the filesystem domain tends to have much higher processor utilization (e.g., close to 100 percent) than the network and storage domains (e.g., typically in the range of 20 to 50 percent). The filesystem domain, therefore, tends to be a bottleneck in the critical path of the storage server, thus limiting the throughput of the storage server.

The prior art technique mentioned above, therefore, addressed this problem by allowing some parallelism within a mutual exclusion domain, particularly one associated with the filesystem processes. In particular that technique disclosed creating a new mutual exclusion domain for certain filesystem processes related to operations on user data, e.g., reads and writes of user data. The new domain was defined to include multiple "threads" which were allowed to execute in parallel. Each logical data set (e.g., each file or LUN) of user data managed by the storage server was logically divided into one or more contiguous subsets called "stripes", and each stripe was uniquely assigned to a separate thread in the new domain. Hence, certain predetermined operations on user data were allowed to operate in parallel if they were directed to different stripes of the data set. However, all other operations had to be serialized.

The prior art technique improved upon earlier technology by allowing a select set of file system operations to run in parallel, without having to make the majority of the filesystem code multiprocessor-safe, and without the need for frequent, low-level synchronization operations. However, it did not take into consideration the significant amount of metadata used by a typical storage server. It has since been determined that processes associated with maintaining and managing such metadata tend to consume a substantial portion of the processing throughput of the filesystem of a storage server. Yet there are many different types of metadata associated with a typical filesystem, many of which have complicated interdependencies. Therefore, it is not practical just to extend the prior art technique to apply to such filesystem metadata.

SUMMARY OF THE INVENTION

The technique introduced here includes a technique for improving throughput in a network storage server, particularly in relation to filesystem processes. The technique provides multiple levels of parallelism of process execution, within a given mutual exclusion domain of a network storage server, in a manner which allows not only operations on user data to be parallelized but also operations on metadata. The specific parallelization scheme used in any given embodiment is based at least partly on the underlying metadata structures used by the storage server. Consequently, a very high degree of parallelization is possible, which significantly improves the throughput of the storage server.

In one embodiment, a plurality of mutual exclusion domains are created in the network storage server, for execution of processes of the network storage server. Execution of processes in the network storage server is scheduled based on the plurality of mutual exclusion domains. The plurality of mutual exclusion domains includes a domain called the "Filesystem" domain here, for processes of a filesystem (storage manager element) of the network storage server. The technique includes creating a hierarchy of subdomains within the Filesystem domain, where each subdomain owns one or more types of processes and each subdomain operates as a separate execution queue (i.e., only one process can execute at a time in each subdomain). Some of these subdomains are associated with metadata and others are associated with user data.

In any particular embodiment, the structure of the hierarchy of subdomains within the Filesystem domain is based at least partially on the specific types of metadata used by the storage server and the specific types of operations expected to be performed on such metadata. Based on that structure, certain subdomains are permitted to execute their processes in parallel with the processes of other subdomains, while other subdomains are precluded from executing their processes in parallel with those of any other subdomain or with those of certain other subdomains (i.e., processes must be serialized). Because the structure of the subdomain hierarchy is based at least partly on the underlying metadata structures used by the storage server, a very high degree of parallelization possible, which significantly improves the throughput of the storage server.

In one embodiment, all subdomains that have an ancestral (vertical) relationship to each other within the hierarchy are precluded from executing processes in parallel with each other, whereas all subdomains that have a non-ancestral relationship to each other within the hierarchy are allowed to execute their processes in parallel with each other. At least some of the subdomains can have sibling relationships to each other within the hierarchy, which can execute their processes in parallel with each other; these can include, for example, stripe-level subdomains used for operations on different logical stripes of user data sets and/or metadata sets.

Other aspects of the technique will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment, nor are they necessarily intended to be mutually exclusive.

Figure 2:
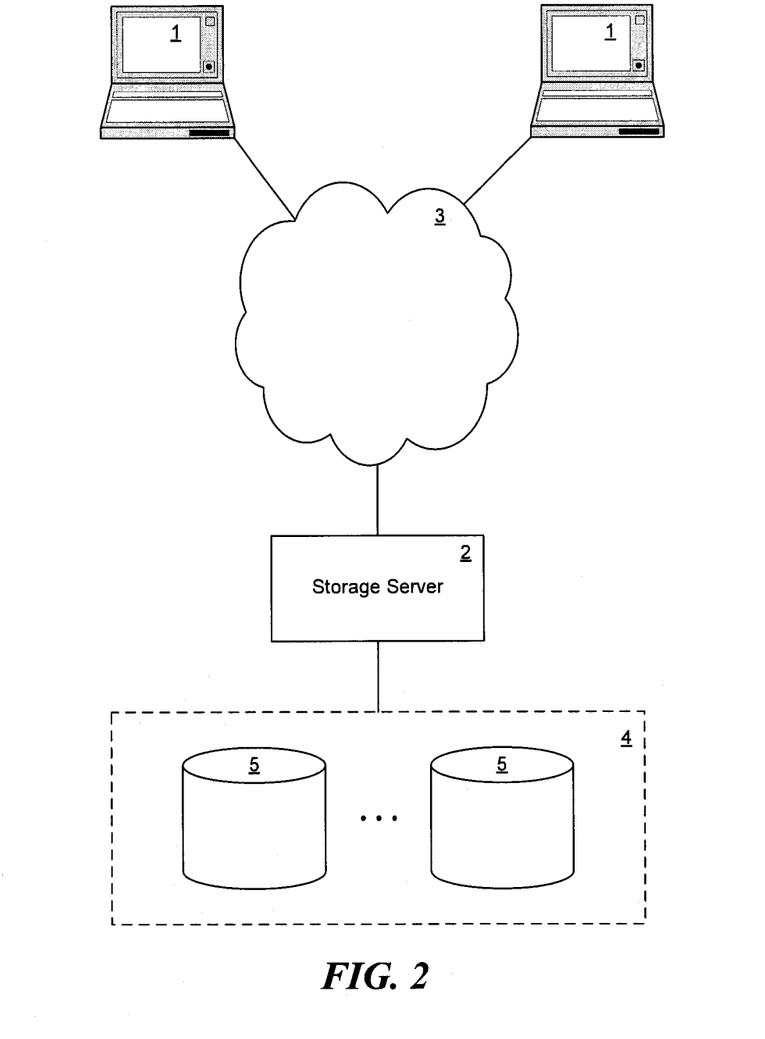
FIG. 2 illustrates a network environment that includes a network storage server and clients.

FIG. 2 illustrates an example of a network storage environment in which the technique introduced here can be implemented. Although the example of FIG. 2 shows a network storage system, it will be understood that the invention can also be implemented in any of various other types of environments. The environment of FIG. 2 includes a network storage server 2 coupled locally to a set of mass storage devices 4, and to a set of clients 1 through an interconnect 3. The technique introduced here for increasing parallelism can be implemented in the storage server 2.

The storage server 2 receives various read and write requests from the clients 1 and accesses the mass storage devices 5 in a persistent storage subsystem 4 to service those requests. Each of the clients 1 may be, for example, a conventional personal computer (PC), server-class computer, workstation, or the like. The mass storage devices 5 may be, for example, conventional magnetic tapes or disks, optical disks such as CD-ROM or DVD based storage, magneto-optical (MO) storage, flash memory, or any other type of non-volatile storage devices suitable for storing large quantities of data, or a combination thereof. The mass storage devices 5 may be organized into one or more volumes of Redundant Array of Independent Disks (RAID).

The storage server 2 may be, for example, a file server, or "filer", such as may be used in a network attached storage (NAS) environment. Alternatively, the storage server may provide clients with block-level access to stored data, such as in a storage area network (SAN) environment. Or, the storage server 2 may be capable of providing both file-level access and block-level access to store data. The storage server 2 can implement one or more of various different protocols, such as common Internet filesystem (CIFS), network filesystem (NFS), hypertext transport protocol (HTTP), simple network management protocol (SNMP), transfer control protocol/Internet protocol (TCP/IP), etc., and can selectively use these protocols as needed.

Further, although the storage server 2 is illustrated as a single unit in FIG. 2, it can have a distributed architecture. For example, the storage server 2 can be designed as a physically separate network module (e.g., "N-blade") and disk module (e.g., "D-blade") (not shown), which communicate with each other over a physical interconnect. Such an architecture allows convenient scaling, such as by deploying two or more N-modules with two or more D-modules, all capable of communicating with each other through the interconnect.

The interconnect 3 may be essentially any type of communication fabric, such as a local area network (LAN), a wide area network (WAN), metropolitan area network (MAN) or the Internet, a Fibre Channel switching fabric, etc. the interconnect three may be based on any one or more of various well-known protocols, such as Ethernet or Fibre Channel protocol (FCP).

Figure 3:
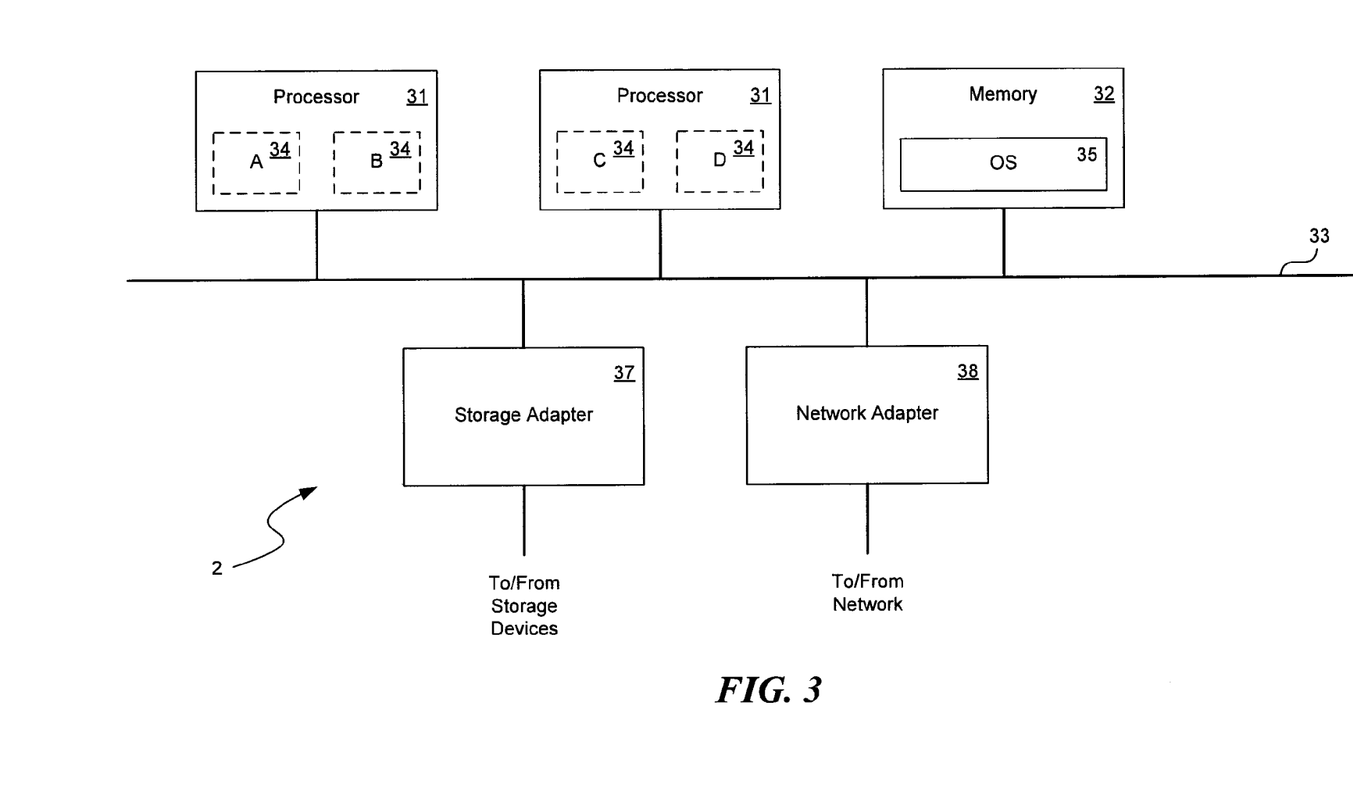
FIG. 3 is a block diagram of a network storage server.

FIG. 3 is a high-level block diagram showing an example of the hardware elements of the storage server 2. Certain standard and well-known components which are not germane to the present invention are not shown. The storage server 2 in the illustrated embodiment is a multi-processor system, in that it includes two physical processors 31 coupled to a bus system 33. Each of the physical processors 31 implements two logical processors 34. One physical processor 31 includes logical processors A and B, while the other physical processor includes logical processors C and D. Note that in other embodiments the storage server 2 may include a number of physical processors other than two, and/or each physical processor may include a number of logical processors other than two.

The bus system 33 is an abstraction that represents any one or more separate physical buses and/or point-to-point connections, connected by appropriate bridges, adapters and/or controllers. The bus system 33, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The physical processors 31 are the central processing units (CPUs) of the storage server 2 and, thus, control the overall operation of the storage server 2. In certain embodiments, the physical processors 31 may accomplish this by executing software stored in memory 32. A physical processor 31 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The storage server 2 also includes memory 32 coupled to the bus system 43. The memory 32 represents any form of random access memory (RAM), read-only memory (ROM), flash memory, or a combination thereof. Memory 32 may store, among other things, the storage operating system 35 of the storage server 2, in which the techniques introduced here can be implemented at least in part.

Also connected to the processors 31 through the bus system 33 are a storage adapter 37 and a network adapter 38. The storage adapter 37 allows the storage server 2 to access the external mass storage devices 4 and may be, for example, a Fibre Channel adapter or a SCSI adapter. The network adapter 38 provides the storage server 2 with the ability to communicate with remote devices such as the clients 1 over a network and may be, for example, an Ethernet adapter or a Fibre Channel adapter.

Memory 32 and mass storage device 36 store software instructions and/or data 35 and 39, which may include instructions and/or data used to implement the techniques introduced here. These instructions and/or data may be implemented as part of the storage operating system 35 of the storage server 2.

Figure 4:
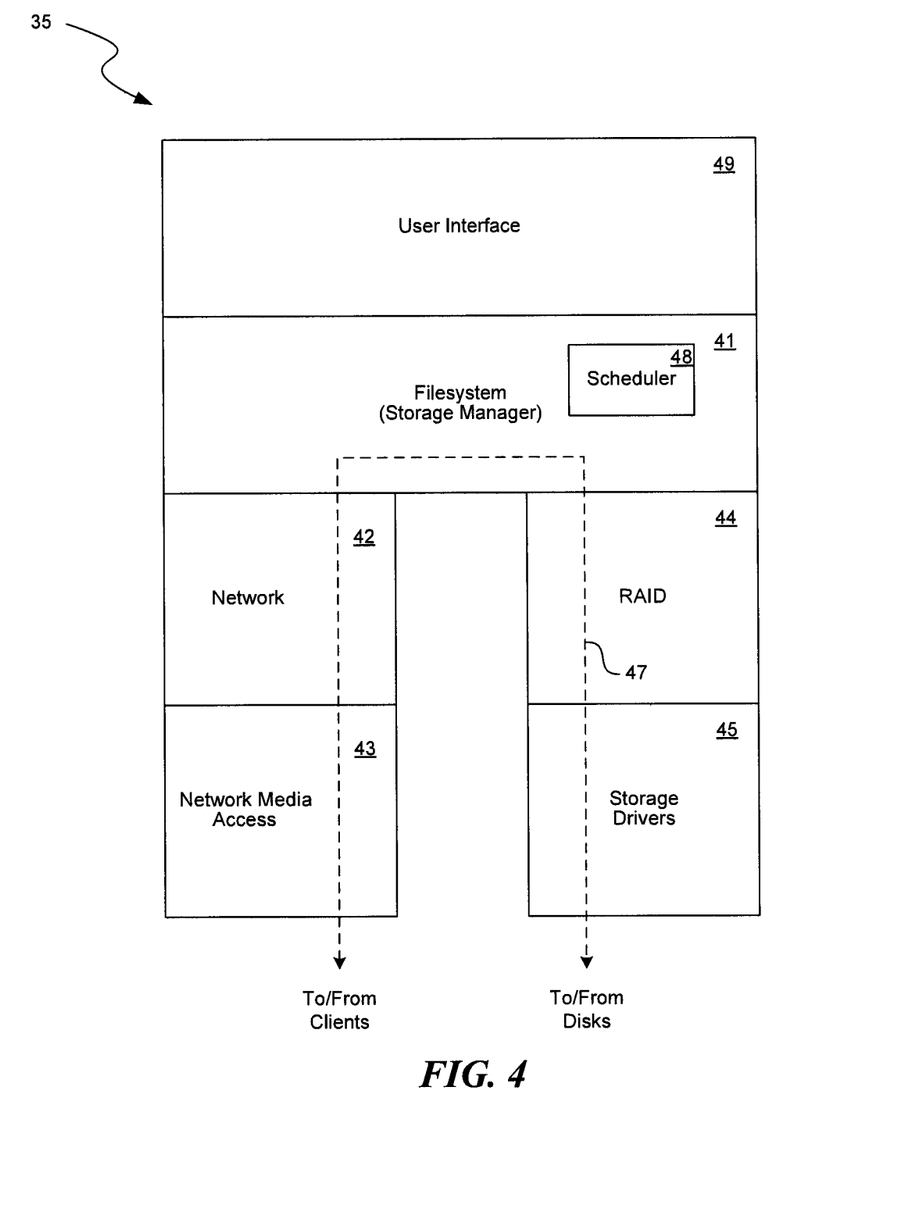
FIG. 4 illustrates the operating system of a network storage server.

As shown in FIG. 4, the operating system 35 of the storage server 2 can include several modules, or layers. These layers include a filesystem 41. The filesystem 41, also called the "storage manager", imposes a structure on files, directories and/or other data containers stored and/or managed by a storage server, and services read/write requests from clients of the storage server. The filesystem 41 includes a scheduler 48 which schedules execution of the various processes associated with the filesystem 41.

Logically under the filesystem 41, the storage operating system 35 also includes a network layer 42 and an associated network media access layer 43, to allow the storage server to communicate over a network (e.g., with clients 1). The network 42 layer implements various protocols, such as NFS, CIFS, HTTP, SNMP, Internet Small Computer System Interface (iSCSI) and TCP/IP. The network media access layer 43 includes one or more drivers which implement one or more protocols to communicate over the network 3, such as Ethernet or FCP. Also logically under the filesystem 41, the storage operating system 35 includes a RAID layer 44 and an associated storage driver layer 45, to allow the storage server 2 to communicate with external mass storage devices 4. The RAID layer 44 implements a RAID redundancy protocol, such as RAID-4, RAID-5 or RAID-6, while the storage driver layer 45 implements a lower-level storage device access protocol, such as FCP or SCSI.

The storage operating system 35 may also include a user interface layer 49, which implements a graphical user interface (GUI) and/or a command line interface (CLI), for example, such as for purposes of administrative access to the storage server 2.

Figure 5:
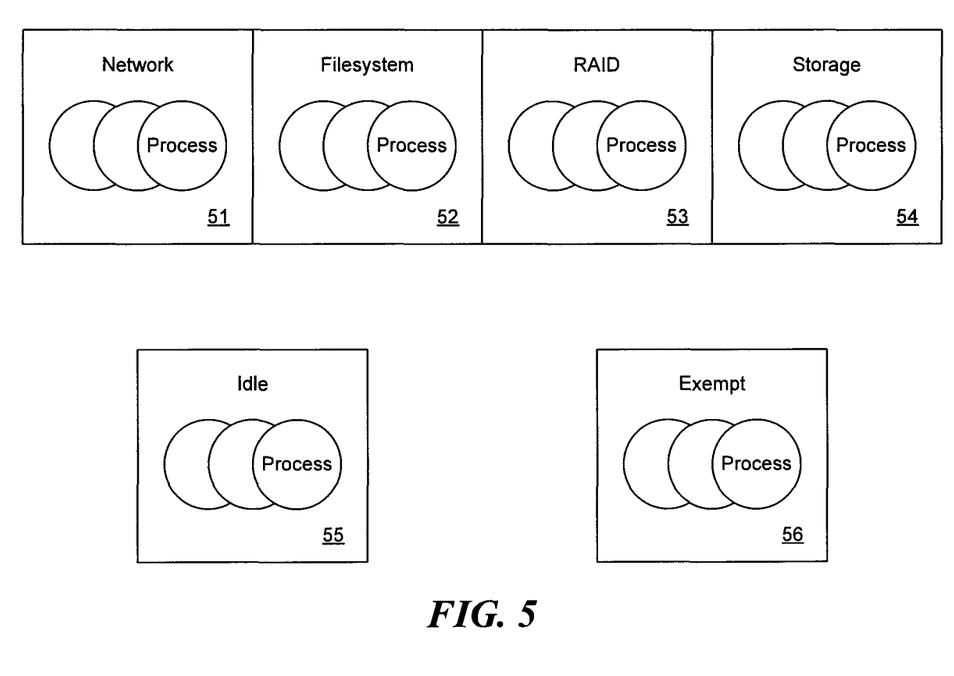
FIG. 5 illustrates mutual exclusion domains that may be implemented in a network storage server.

To ensure that instructions and data are safe for execution in the multi-processor environment of the storage server 2, the operating system 35 can implement very coarse-grained symmetric multiprocessing (CSMP) instead of fine-grained symmetric multiprocessing found on some other systems, typically implemented by explicit locking mechanisms. Hence, the operating system 35 can be organized into a number of mutual exclusion domains 51-56 according to their functionality, as shown in FIG. 5. A mutual exclusion domain is a grouping of processes. The domains 51 are defined according to functionality so that it is not permitted for two processes in different domains to operate on the same data simultaneously. Furthermore, only one process at a time can execute in each domain, with certain exceptions noted below.

As illustrated in FIG. 5, the following domains can be implemented in the storage server 2: Network, Filesystem, RAID, Storage, Idle and Exempt. The Network, Filesystem, RAID, and Storage domains form the critical path of the pipeline for processing client requests. The Network domain 51 includes all network-specific processes of the storage server 2. The Storage domain 54 includes all storage-specific processes of the storage server 2. The RAID domain 53 includes all RAID-specific processes of the storage server 2. The Filesystem domain 52 includes filesystem processes and all other processes that do not belong to another domain based on their functionality.

The scheduler 48 generally allows only one process to execute at a time in the Network, RAID and Storage domains. The Idle domain 55 is the domain within which a processor executes the idle loop. Idle threads from multiple processors may execute simultaneously in the Idle domain. The Exempt domain 56 includes certain processes that are inherently multi-processor safe because they only operate on their input data (such as RAID XOR computations, compression/decompression, etc.), i.e., there is no global sharing of state.

Figure 6:
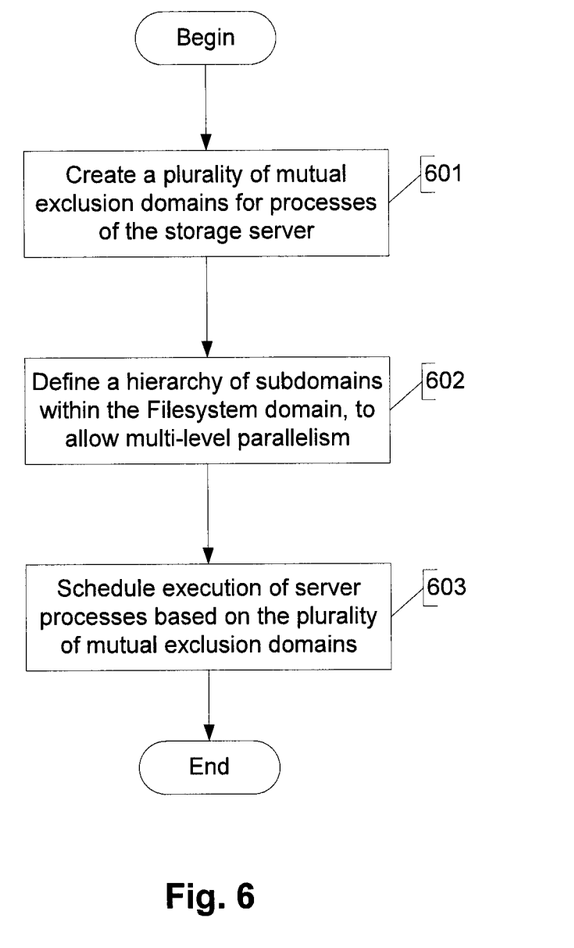
FIG. 6 illustrates at a high level a technique for achieving multi-level parallelization within a mutual exclusion domain.

FIG. 6 illustrates the technique introduced here at a high level, according to one embodiment. The technique includes, at 601, creating a plurality of mutual exclusion domains in the storage server, as described above. The technique further includes, at 602, defining a hierarchy of subdomains within the Filesystem domain, to allow multi-level parallelism of operations in the Filesystem domain, as further described below. The process further includes, at 603, scheduling execution of server processes in the storage server 2, based on the plurality of mutual exclusion domains. These operations 601-603 may be carried out by the scheduler 48, for example, and/or by some other element(s) of the storage server 2.

Figure 7:
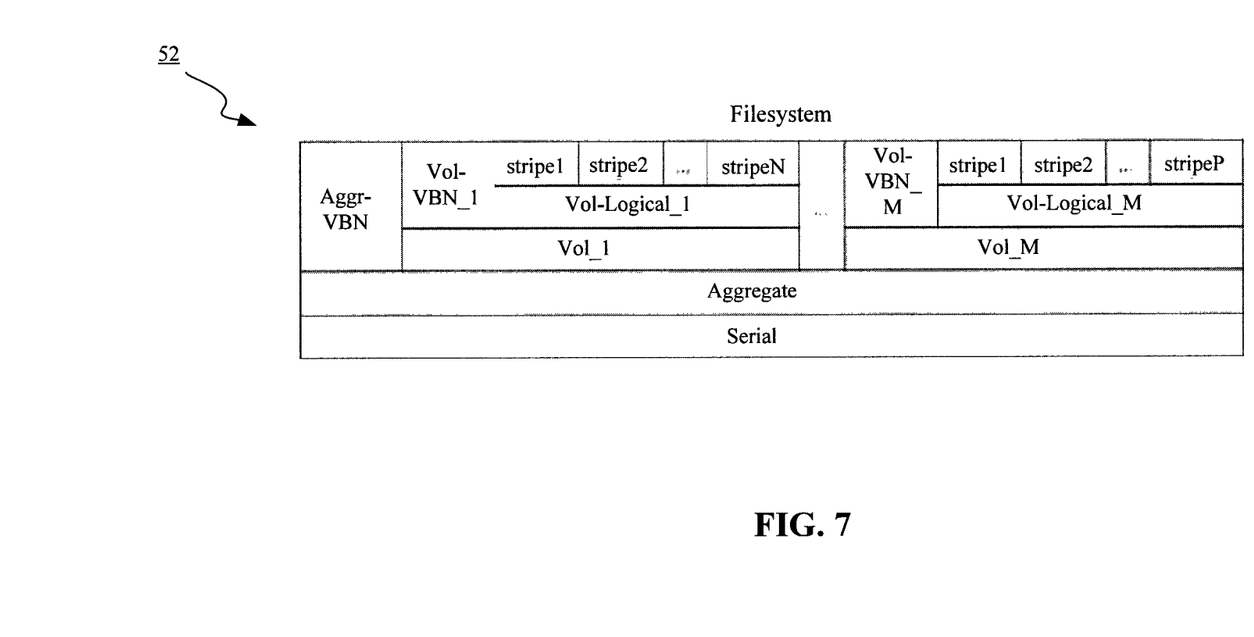
FIG. 7 illustrates an example of the structure of the Filesystem mutual exclusion domain.

FIG. 7 illustrates the structure of the Filesystem domain according to one embodiment. As shown, the Filesystem domain includes multiple subdomains, related to each other in a hierarchy, where each of the subdomains owns one or more types of processes and operates as an execution queue (i.e., only one process can execute at a time in each subdomain). Many processes are associated with one or more specific types of data or metadata upon which they operate; consequently, most of the subdomains can be viewed as being associated with one or more particular classes of data or metadata, as explained below. Hence, some of these subdomains are dedicated for specific types of metadata and associated processes while others are dedicated for user data and associated processes.

The structure of the hierarchy determines the overall parallelization scheme and is designed essentially to mirror the various data and metadata structures used by the filesystem

41. In certain embodiments this hierarchy is encoded, designed, configured or otherwise built into, the scheduler 48 of the filesystem 41. This encoding/design/configuration may include, for example, software instructions, data, or metadata, or any combination thereof, defining the various subdomains and their relationships to each other. The particular subdomain or subdomains that get invoked at any particular time is determined by the scheduler 48 whenever a message is received by the filesystem 41 from another layer of the storage operating system 35.

The structure of the hierarchy (which, as noted above, reflects the underlying types of data and metadata structures) permits certain subdomains to execute their processes in parallel with processes of other subdomains, but prevents other subdomains from executing their processes in parallel with processes of any other subdomain or with processes of some other subdomains. Any subdomains that have an ancestral (vertical) relationship to each other within the hierarchy are precluded by the scheduler 48 from executing their processes in parallel with each other, whereas subdomains that do not have an ancestral relationship to each other within the hierarchy are normally permitted to execute their processes in parallel with each other. Additionally, in some instances it may be desirable to allow processes in different subdomains that can execute in parallel to share certain data structures. In those cases, conventional spin locks can be used to force serial execution of those processes.

The hierarchy of subdomains can be thought of as a hierarchy of reader and writer locks. When running a process in a subdomain, that subdomain in essence has an exclusive writer lock on all of its child subdomains, and a shared reader lock on all of its ancestors subdomains. Note that for purposes of this description, the subdomain hierarchy can be thought of as an inverted tree structure, where descendency goes from bottom to top in FIG. 7. Thus, in FIG. 7 the "child" of a given subdomain (if it has any) would be located above that subdomain and the parent of that subdomain (if it has any) would be located below it.

Before discussing the various subdomains in detail, it may be helpful first to clarify certain terms. An "aggregate" is a logical aggregation of physical storage, combining one or more physical mass storage devices or parts thereof into a single logical storage object, which contains or provides storage for one or more other logical data sets at a higher level of abstraction (e.g., volumes). "Aggregate-level processes" are processes that are inherently applicable to an entire aggregate and that cannot be applied at a more-granular level, i.e., at a higher level of abstraction. Examples of such processes may include, for example, increasing the size of an aggregate and creating new volumes.

A "volume" is a logical data set which is an abstraction of physical storage, combining one or more physical mass storage devices (e.g., disks) or parts thereof into a single logical storage object, which obtains its storage from an aggregate and which is managed as a single administrative unit. "Volume-level processes" are processes that are inherently applicable to an entire volume, but not an entire aggregate, and that cannot be applied at a higher level of abstraction. Examples of such processes may include, for example, destroying a volume or taking a volume off-line.

A "buffer tree" is hierarchical data/metadata structure (e.g., a linked list) used by the filesystem to keep track of the locations of the data blocks of a file or other type of data object. Its root is an inode. A buffer tree includes one or more levels of indirect blocks, each of which contains one or more pointers to lower-level indirect blocks and/or to the direct blocks (user data blocks) of the data object.

An "inode" is a metadata container used to store metadata about a file, directory or other file system object, such as ownership of the file, access permission for the file, size of the file, file type, and pointers used to locate the data blocks for the file. An inode is the root of (i.e., contains pointers to) the highest level of indirect blocks in the buffer tree of a data object.

Referring again to FIG. 7, the hierarchy of subdomains within the Filesystem domain includes a Serial subdomain. Above the Serial subdomain, the hierarchy further includes an Aggregate subdomain. Above the Aggregate subdomain in FIG. 7 (or logically "below" it in hierarchical terms), the hierarchy further includes an Aggr-VBN subdomain and one or more volume ("Vol") subdomains, i.e., one Vol subdomain for each volume managed by the storage server 2. Above the Vol subdomains, the hierarchy further includes one or more Volume-Logical ("Vol-Logical") subdomains, one for each volume managed by the storage server 2, and one or more Volume-VBN ("Vol-VBN") subdomains, one for each volume managed by the storage server 2. Above each Vol-Logical subdomain, the hierarchy further includes one or more Stripe subdomains. As used in this description, the term "VBN" stands for volume block number and means a block index into a flat data container, such as either an aggregate (e.g., in the case of Aggr-VBN) or a volume (e.g., in the case of Vol-VBN).

The Stripe subdomains will be discussed here first. In one embodiment each volume is logically divided into contiguous stripes. A "stripe", as the term is used herein, is a set of logically sequential data offsets in a set of data (e.g., a volume, file or LUN). To improve parallelism of operations on user data, each stripe is assigned to a separate thread, or Stripe subdomain in this description. A given stripe is never assigned to more than one Stripe subdomain at a time. The Stripe subdomains for any given volume have sibling relationships to each other in the hierarchy, which means that they can execute their processes in parallel with each other, at least as long as no such process targets more than one stripe. As shown, assuming a particular volume, volume 0, includes N stripes, the Stripe subdomains for volume 0 may include Stripe0, Stripe1, . . . , StripeN. Similarly, assuming another volume, volume M, includes P stripes, the Stripe subdomains for volume M may include Stripe0, Stripe1, . . . , StripeP.

User data operations owned by the Stripe subdomains can include, for example, reading data from a stripe, writing data to a stripe, performing a lookup of a directory, reading a directory, getting an attribute associated with a stripe, etc. Any Stripe subdomain can also execute its processes in parallel with processes of the Aggr-VBN subdomain and/or any Vol-VBN subdomain, since these subdomains have non-ancestral relationships with the Stripe subdomains.

In one embodiment, volume-level metadata of the storage server 2 naturally fall into two categories: 1) metadata that are visible to clients ("client-visible"), such as metadata for allocation of files, directories and inode files; and 2) metadata that are not client-visible to clients, such as block numbers, free/used block maps, etc. In general, these two categories of metadata can be operated on in parallel for the same volume without conflicting. Accordingly, in the illustrated embodiment two separate types of subdomains are provided within the filesystem domain, for these different metadata categories, namely, Vol-Logical subdomains and Vol-VBN subdomains.

A Vol-Logical subdomain provides exclusive access to a volume's client-visible metadata, such as directories and inode files. There is a one-to-one relationship between each Vol-Logical subdomain its parent Vol subdomain, discussed below. Examples of operations owned by the Vol-Logical subdomains are creating a volume, removing volume, setting attributes of a volume, etc. All of the Vol-Logical subdomains have sibling relationships to each other in the hierarchy; therefore, any Vol-Logical subdomain can execute its processes in parallel with any other Vol-Logical subdomain.

A Vol-VBN subdomain provides exclusive access to a volume's metadata that are not client-visible, such as bitmaps and delete logs. Examples of the operations owned by a Vol-VBN subdomain are: data block reclamation, snapshot scanners and segment cleaning/defragmentation. There is a one-to-one relationship between each Vol-VBN subdomain and its parent Vol subdomain.

Because there are very few (if any) instances where a physical index based operation requires interaction with a logical index based operation, Vol-Logical and Vol-VBN subdomains can run concurrently. Each Vol-Logical subdomain has a non-ancestral relationship to the Vol-VBN subdomain of the same volume. However, Vol-Logical subdomain and Vol-VBN subdomains each have vertical (ancestral) relationships with all other subdomains for the same volume (i.e., with the Vol and Stripe subdomains for the same volume), except the Aggr-VBN subdomain, as described below. Therefore, no Vol-Logical or Vol-VBN subdomain can execute in parallel with any other subdomain for the same volume, except Aggr-VBN, or with any lower-level subdomain (e.g., Aggregate, Serial, etc).

The Aggr-VBN subdomain owns certain aggregate-level processes that are known to be non-conflicting with volume-level and higher-level processes. These can include, for example, operations affecting a free space map of the aggregate. In the illustrated embodiment, therefore, the Aggr-VBN subdomain has a non-ancestral relationship to all other subdomains above the aggregate subdomain and therefore can execute processes in parallel with any other subdomain above the aggregate subdomain.

The Vol subdomains own the volume-level processes of the filesystem. A separate Vol subdomain is created for each volume managed by the storage server 2. For example, assuming the storage server 2 manages M volumes, the volume subdomains include subdomains Vol_1, Vol_2, . . . , Vol_M. All of the Vol subdomains have a sibling relationship to each other; therefore, any Vol subdomain can execute its processes in parallel with those of any other Vol subdomain. For instances where access to both physical based and logical based volume metadata is required, the operations can be synchronized by running them in the corresponding Vol subdomain. Note that data structures that reside in the aggregate but are associated with a volume, such as a volume's RAID labels or deduplication fingerprint files, can also be associated with a Vol subdomain. There is a one-to-N relationship between a Vol subdomain and its parent, the Aggr subdomain. Examples of operations that can be owned by a Vol subdomain are: deswizzling, block sharing, and miscellaneous volume-level operations. Swizzling is a process that re-maps block numbers so that storage blocks can be stored at different locations on a destination filesystem than they are on a source filesystem; deswizzling is the reversal of that process.

The Aggregate subdomain owns all aggregate-level processes of the filesystem. The Aggregate subdomain locks out all higher-level subdomains, e.g., the Aggr-VBN subdomain and all volume-specific subdomains. As such, it can update essentially any data structure within an aggregate. There is a one-to-N relationship between the Aggregate subdomain and its parent, the Serial subdomain. An example of an operation that can be owned by the Aggregate subdomain is increasing the size of an aggregate.

Below the Aggregate subdomain in the hierarchy is the Serial subdomain, which owns certain filesystem processes which by their nature are required to be serialized, e.g., processes that are inherently not multiprocessor-safe ("MP-safe"), processes which must lock out all other filesystem processes. The Serial subdomain is the least desirable subdomain for a process to run in, since it is the bottom of the subdomain hierarchy and is exclusive of all other subdomains. Examples of operations that may need to run in the Serial subdomain are: setting up a cross-volume special access file, remote shell processes, processes for administrative access to the filesystem, processes to implement various commands, etc.

One advantage of this architecture, in addition to increased parallelization, is that it permits parallelization to be increased incrementally for any given platform. That is, with this architecture it is easy to make a system, which initially is not highly parallelized, more parallelized, in stages. For example, initially most processes, even those which can potentially be parallelized, may be assigned to the Serial subdomain, for convenience, while only a few select processes are assigned to subdomains that can operate in parallel. Later, when desired, additional processes can be reassigned to subdomains that can execute in parallel, potentially in multiple stages, until the system is parallelized to its full desired potential.

As noted above, spin locks can be used to force serial execution in some instances. This may be done, for example, where processes in different domains, which would otherwise be permitted to execute in parallel (e.g., where they are in sibling subdomains), need to share data structures. However, when a process executes in any given subdomain, no spin lock is required for data associated with any descendant subdomain of that given subdomain in the hierarchy, since the scheduler 48 will prevent parallel execution of subdomains that have ancestor-descendent relationships to each other. For example, if a process is executing in a Vol subdomain, separate spin locks do not need to be acquired in the corresponding Vol-Logical, Vol-VBN and Stripe subdomains.

Note that other embodiments can create different parallelization schemes within the Filesystem domain (or within any other mutual exclusion domain). Such schemes may include more or fewer levels of parallelism or granularity than those shown in FIG. 7. The manner in which subdomains are created and arranged, as described above, is amenable to further subdivision and/or expansion to create additional and/or different subdomains, to adapt to evolving product designs.

For example, to achieve greater parallelism it might be desirable to subdivide the Aggr-VBN and Vol-VBN subdomains into smaller subdomains corresponding to different block number ranges or RAID group ranges. As another example, it might be desirable to subdivide the Vol-Logical subdomain to achieve greater parallelism in a single volume, even in the presence of metadata operations. A subdomain structure that facilitates exclusive access to inodes might be useful. For this to be useful, however, it might be desirable to support the ability for a thread of execution to own multiple subdomains at once, as discussed below.

As yet another example, it may be desirable to subdivide the Aggregate subdomain to create an Aggr-Logical subdomain (similar to the Vol-Logical subdomains). This subdomain could be used for aggregate activity that can execute concurrently with client operations.

Further, it might be desirable to add another subdomain into the hierarchy between the Aggregate and Vol subdomains. This additional subdomain could group related volumes (e.g., by clone relationships) together so that unrelated operations could run concurrently.

Additionally, CPU-specific or thread-specific data structures may exist in the storage server 2. In order to maintain these structures as concurrently as possible, it may be desirable to create subdomains that are each tied to a specific thread or CPU.

Figure 8:
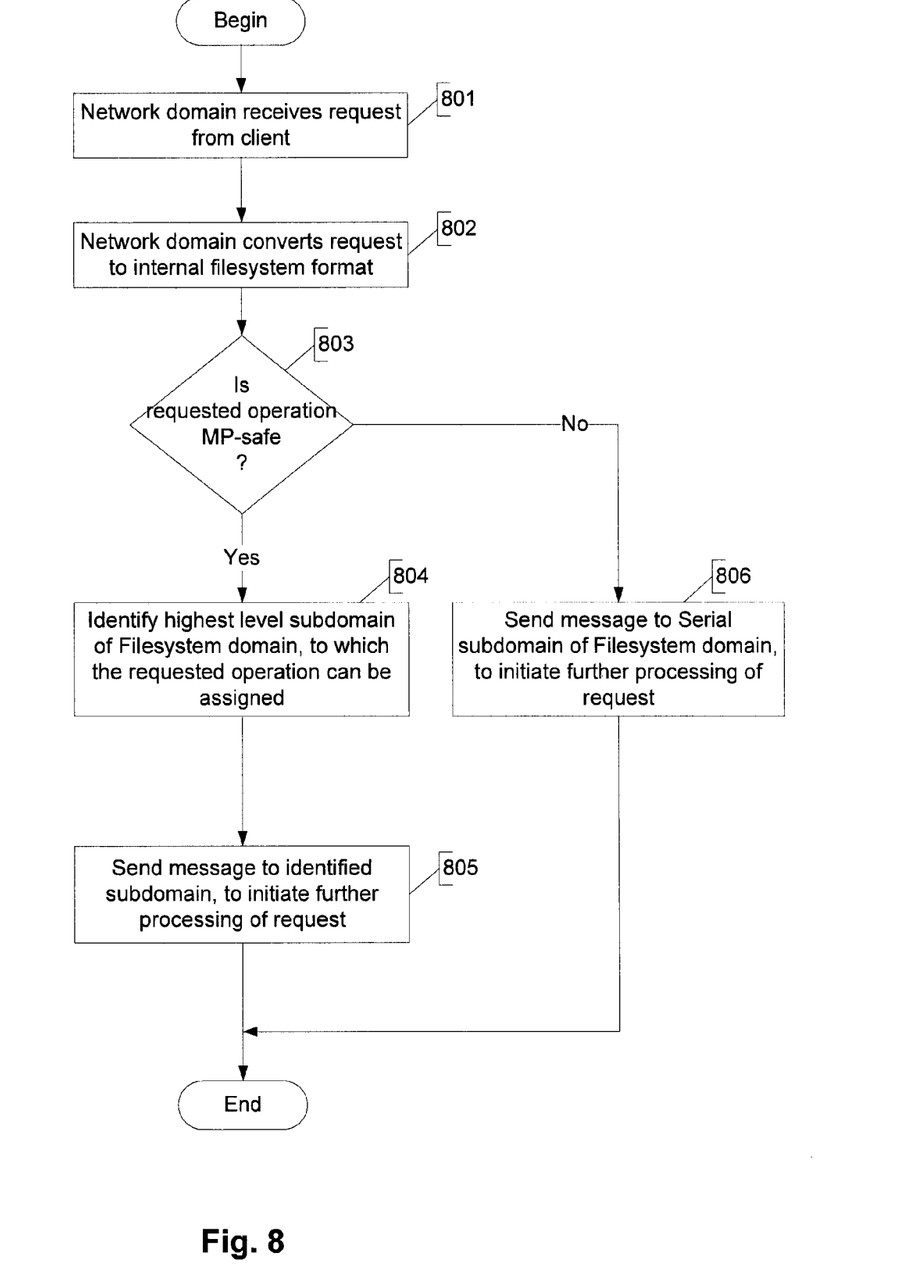
FIG. 8 shows a routine for handling a client request in a network storage server.

FIG. 8 illustrates a routine that can be performed by the storage operating system 35 to processing a request, according to the technique introduced here. At 801, when a client transmits a request to the storage server 2, initially the Network domain (FIG. 5) in the storage server 2 receives the request. At 802 the Network domain converts the request to an internal format recognized by the filesystem 41 (FIG. 4), the details of which are not germane to this description. The Network domain then determines at 803 whether the requested operation is inherently multiprocessor-safe ("MP-safe"). In general, the storage operating system 35 is preconfigured with knowledge of which operations are inherently MP-safe. These operations may include, for example, reads and writes.

If the requested operation is not inherently MP-safe, the flow proceeds to 806, in which a message is sent to an appropriate process within the Serial subdomain of the Filesystem domain, to trigger further processing of the request. Which specific type of process depends on the nature of the requested operation.

If the operation is inherently MP-safe, then the flow instead proceeds from 803 to 804. At 804, the filesystem 41 (e.g., more specifically, the scheduler 48) identifies the highest level subdomain within the filesystem domain, to which the requested operation can be assigned. This determination is made based on the nature of the requested operation and/or the type of data or metadata upon which the operation is to operate. In some instances there may be a preconfigured list of operations and the corresponding subdomains to which they belong, for example. In other instances, logic implementing a decision tree may be used to determine the appropriate subdomain. In some instances, there may be only one subdomain to which a given operation can be assigned. In other instances, there may be multiple subdomains to which an operation can be assigned. For example, a given operation on volume metadata might be executable in either a Vol-Logical subdomain or the Vol subdomain. Normally, the initial preference would be to assign it to the Vol-Logical subdomain according to this step.

At 805, therefore, a message is sent to the identified subdomain, to initiate further processing of the request. The routine then ends.

Various extensions and/or modifications to the technique introduced here can also be envisioned. For example, file system metadata can be striped in a similar manner to user data. Separate subdomains can be created for those metadata stripes, to allow operations targeting different metadata stripes to be performed in parallel.

As another example, it may be desirable in certain situations to allow multiple subdomains to be owned simultaneously by a given thread of execution. This may be desirable in order to service a request (e.g., read or write) that targets user data (or metadata) spanning two or more adjacent stripes. In one approach, if a requested operation relates to data that spans two or more adjacent stripes, the operation would be assigned to the corresponding Vol subdomain. However, as an alternative, the operation could be assigned concurrently to the Stripe subdomains corresponding to the two or more stripes which the data spans, providing none of those subdomains is currently in use.

As another example, concurrent ownership of subdomains can be used to avoid suspend-restart cycles. Normally, when a process suspends for any reason (e.g., to allow an I/O operation), it must be restarted from the beginning of the process. These suspend-restart cycles are expensive in terms of adversely affecting throughput. Accordingly, in one embodiment, when the scheduler 48 detects a need to suspend a given process, before suspending the process the scheduler 48 determines whether any other process is executing which conflicts with that process. If no other process is executing which conflicts with that process, then the executing process is reassigned on-the-fly to the parent subdomain (or grandparent subdomain, etc.) of the subdomain in which it is currently executing. This avoids the need to suspend and restart the process. For example, if a process is executing in Vol-Logical, it can be reassigned on-the-fly to the corresponding Vol subdomain instead of suspending and restarting it.

As yet another example, suppose a first process has been suspended, and while it is suspended, a second, non-conflicting process executes. In such cases the suspended process can resume from the point where it was suspended, rather than having to restart from the beginning. In one embodiment, therefore, when a suspended first process is ready to resume or restart, it first determines whether any conflicting process has run while it was suspended. The suspended process can do this by checking whether it has received a predetermined type of message from another process while it was suspended, where such type of message indicates that a second, conflicting process has run while the first process was suspended. If the first process detects such a message, it performs a restart. If it does not detect such a message, it performs a resume instead of a restart, thereby helping to improve overall performance.

Thus, a technique for providing multi-level parallelism within a mutual exclusion domain has been described. Note that the technique introduced here could alternatively be applied in a processing device other than a storage server. As just one example, this technique could easily be adapted for implementation in a networking device, such as a switch, router or gateway.

Furthermore, the principles described above are not necessarily limited in application to a single multi-processor processing device. That is, it is possible to apply the principles described above to a distributed system, to facilitate two or more processing devices (e.g., two or more storage servers, each of which includes one or more processors) safely having access to the same data.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment. On the other hand, different embodiments may not be mutually exclusive either.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
in a network storage server, creating a plurality of mutual exclusion domains for execution of processes of the network storage server, the plurality of mutual exclusion domains including a first domain, the first domain being a storage filesystem domain;
creating a hierarchy of storage filesystem subdomains within the first domain, wherein each of the subdomains corresponds to one or more types of processes, including defining in the hierarchy a first plurality of subdomains that are permitted to execute processes in parallel with each other and a second plurality of subdomains that are precluded from executing processes in parallel with each other; and
assigning processes for execution in the network storage server as each corresponding to the first plurality of subdomains that are permitted to execute processes in parallel with each other or to the second plurality of subdomains that are precluded from executing processes in parallel with each other based at least partially on a metadata type of metadata to be operated on by the each process and an operation type expected to be performed on the metadata.

2. A method as recited in claim 1, wherein scheduling execution of processes in the network storage server based on the plurality of mutual exclusion domains comprises:
assigning each of a plurality of operations to an appropriate subdomain in the hierarchy based on a nature of the operation and a type of data or metadata upon which the operation is to operate.

3. A method as recited in claim 1, wherein each of the subdomains operates as an execution queue.

4. A method as recited in claim 3, wherein the hierarchy of subdomains includes a plurality of metadata subdomains for parallel execution of metadata related processes and a plurality of user data subdomains for parallel execution of user data related processes.

5. A method as recited in claim 4, wherein the second plurality of subdomains have an ancestral relationship within the hierarchy.

6. A method as recited in claim 4, wherein all subdomains which have an ancestral relationship to each other within the hierarchy are precluded from executing processes in parallel with each other.

7. A method as recited in claim 4, wherein the first plurality of subdomains have a non-ancestral relationship within the hierarchy.

8. A method as recited in claim 4, further comprising:
logically dividing a user data set managed by the network storage server into a plurality of stripes; and
assigning each of the stripes to a different one of a third plurality of subdomains in the hierarchy of subdomains within the first domain, for processing of requests related to the user data set, wherein the third plurality of subdomains are permitted to execute processes in parallel with each other.

9. A method as recited in claim 8, further comprising:
receiving a request to perform an operation that spans two stripes of the plurality of stripes; and
assigning the operation to a subdomain which is an ancestor of the subdomains to which the two stripes are assigned.

10. A method as recited in claim 8, further comprising:
receiving a request to perform an operation of data that spans two stripes of the plurality of stripes; and
assigning the operation concurrently to the subdomains to which the two stripes are assigned.

11. A method as recited in claim 4, further comprising:
logically dividing a metadata set managed by the network storage server into a plurality of stripes; and
assigning each of the stripes of the metadata set to a different one of a fourth plurality of subdomains in the hierarchy of subdomains within the first domain, for processing of requests related to the metadata set, wherein the fourth plurality of subdomains are permitted to execute processes in parallel with each other.

12. A method as recited in claim 4, wherein all subdomains which have a non-ancestral relationship to each other within the hierarchy are allowed to execute processes in parallel with each other.

13. A method as recited in claim 4, wherein the first domain corresponds to processes of a storage manager element of the network storage server.

14. A method as recited in claim 13, wherein the hierarchy of subdomains comprises a plurality of aggregate-level subdomains, a plurality of volume-level subdomains, and a plurality of file-level subdomains.

15. A method as recited in claim 13, wherein the hierarchy includes a plurality of metadata subdomains for parallel execution of metadata related processes and a plurality of user data subdomains for parallel execution of user data related processes.

16. A method as recited in claim 4, wherein when a process is executing in any subdomain, no spin lock is required for data associated with any descendant subdomain of said any subdomain.

17. A method as recited in claim 4, further comprising:
detecting a need to suspend a first process executing in a first subdomain in the hierarchy;
responsive to said detecting, determining whether any process which conflicts with the first process is currently executing; and
responsive to a determination that no process which conflicts with the first process is currently executing, avoiding a restart of the first process by reassigning the first process to a subdomain which is an ancestor of the first subdomain.

18. A method as recited in claim 4, further comprising:
suspending a first process executing in a first subdomain in the hierarchy;

executing a second process in a second subdomain in the hierarchy while the first process is suspended, wherein the first and second processes are non-conflicting processes such that the second process cannot perform an action which affects the first process; and avoiding a restart of the first process by performing a resume of the first process, in response to detecting that no process that conflicts with the first process has run while the first process was suspended.

19. A method comprising:

in a network storage server, creating a plurality of mutual exclusion domains for execution of processes of the network storage server, the plurality of mutual exclusion domains including a first domain for processes of a storage manager element of the network storage server, the first domain being a storage filesystem domain;

creating a hierarchy of storage filesystem subdomains within the first domain, wherein each said subdomain corresponds to one or more types of processes and operates as an execution queue, including defining in the hierarchy a first plurality of subdomains that are permitted to execute processes in parallel with each other and a second plurality of subdomains that are precluded from executing processes in parallel with each other, wherein all subdomains that have an ancestral relationship to each other within the hierarchy are precluded from executing processes in parallel with each other and all subdomains that have a non-ancestral relationship to each other within the hierarchy are allowed to execute processes in parallel with each other, wherein at least some of the second plurality of subdomains have sibling relationships to each other within the hierarchy, wherein the hierarchy of subdomains includes a plurality of metadata subdomains for parallel execution of metadata related processes and a plurality of user data subdomains for parallel execution of user data related processes, and wherein the hierarchy of subdomains further includes a plurality of aggregate-level subdomains, a plurality of volume-level subdomains and a plurality of stripe-level subdomains; and assigning processes for execution in the network storage server as each corresponding to the first plurality of subdomains that are permitted to execute processes in parallel with each other or to the second plurality of subdomains that are precluded from executing processes in parallel with each other based at least partially on a metadata type of metadata to be operated on by the each process and an operation type expected to be performed on the metadata.

20. A method as recited in claim 19, further comprising:

logically dividing a data set managed by the network storage server into a plurality of stripes; and assigning each of the stripes to a different one of the stripe-level subdomains, for processing of requests related to the data set.

21. A machine-readable storage medium storing instructions which, when executed in a processing device, cause the processing device to perform operations comprising:

creating a plurality of mutual exclusion domains for execution of processes of the processing device, each said mutual exclusion domain corresponding to one or more processes of the processing device, the plurality of mutual exclusion domains including a first domain, the first domain being a storage filesystem domain;

enabling a plurality of levels of parallelism for executing processes of the first domain, by defining a hierarchy of storage filesystem subdomains within the first domain; and assigning processes for execution in the network storage server as each corresponding to the first plurality of subdomains that are permitted to execute processes in parallel with each other or to the second plurality of subdomains that are precluded from executing processes in parallel with each other based at least partially on a metadata type of metadata to be operated on by the each process and an operation type expected to be performed on the metadata.

22. A machine-readable storage medium as recited in claim 21, wherein each subdomain in the hierarchy operates as an execution queue.

23. A machine-readable storage medium as recited in claim 22, wherein the hierarchy includes a plurality of metadata subdomains for parallel execution of metadata related processes and a plurality of user data subdomains for parallel execution of user data related processes.

24. A network storage server comprising:

a plurality of processors;

a storage interface coupled to the plurality of processors, through which the storage server can access a persistent storage subsystem;

a network interface coupled to the plurality of processors, through which the storage server can communicate with a storage client; and a memory coupled to the plurality of processors, the memory storing instructions for defining a plurality of mutual exclusion domains for enabling multi-processor safe execution of processes on the storage server, including instructions for creating a hierarchy of storage filesystem subdomains operable as execution queues within a first domain of the plurality of mutual exclusion domains, the first domain being a storage filesystem domain, to control parallelism of execution of processes, wherein each said subdomain corresponds to one or more types of processes; and assigning processes for execution in the network storage server as each corresponding to the first plurality of subdomains that are permitted to execute processes in parallel with each other and have a non-ancestral relationship to each other within the hierarchy, or to the second plurality of subdomains that are precluded from executing processes in parallel with each other and have an ancestral relationship to each other within the hierarchy, based at least partially on a metadata type of metadata to be operated on by the each process and an operation type expected to be performed on the metadata.

25. A network storage server as recited in claim 24, wherein all subdomains which have an ancestral relationship to each other within the hierarchy are precluded from executing processes in parallel with each other, and all subdomains which have a non-ancestral relationship to each other within the hierarchy are allowed to execute processes in parallel with each other.

26. A network storage server as recited in claim 25, wherein the first plurality of subdomains have a sibling relationship within the hierarchy.

27. A network storage server as recited in claim 24, further comprising logic to:

divide a user data set managed by the network storage server into a plurality of logical stripes; and assign each of the stripes to a different one of a third plurality of subdomains in the hierarchy of subdomains within the first domain, for processing of requests related to the user data set, wherein the third plurality of subdomains are permitted to execute processes in parallel with each other.

28. A network storage server as recited in claim 27, further comprising logic to:

receive a request to perform a read of data that spans two stripes of the plurality of stripes; and assign the read request to a subdomain which is an ancestor of the subdomains to which the two stripes are assigned.

29. A network storage server as recited in claim 28, further comprising logic to:

receive a request to perform a read of data that spans two stripes of the plurality of stripes; and assign the read request concurrently to the subdomains to which the two stripes are assigned.

30. A network storage server as recited in claim 24, further comprising logic to:

divide a metadata set managed by the network storage server into a plurality of logical stripes; and assign each of the stripes of the metadata set to a different one of a fourth plurality of subdomains in the hierarchy of subdomains within the first domain, for processing of requests related to the metadata set, wherein the fourth plurality of subdomains are permitted to execute processes in parallel with each other.

31. A network storage server as recited in claim 24, wherein the first domain corresponds to processes of a storage manager element of the network storage server.

32. A network storage server as recited in claim 31, wherein the hierarchy of subdomains comprises a plurality of aggregate-level subdomains, a plurality of volume-level subdomains, and a plurality of file-level subdomains.

33. A network storage server as recited in claim 24, wherein the hierarchy of subdomains comprises a plurality of metadata subdomains for parallel execution of metadata related processes and a plurality of user data subdomains for parallel execution of user data related processes.

34. A network storage server as recited in claim 24, wherein when a process is executing in any subdomain, no spin lock is required for data associated with any descendant subdomain of said any subdomain.

35. A network storage server as recited in claim 24, further comprising logic to:

detect a need to suspend a first process executing in a first subdomain in the hierarchy;

responsive to said detecting, determine whether any process which conflicts with the first process is currently executing; and responsive to a determination that no process which conflicts with the first process is currently executing, avoid a restart of the first process by reassigning the first process to a subdomain which is an ancestor of the first subdomain.

36. A network storage server as recited in claim 24, further comprising logic to:

suspend a first process executing in a first subdomain in the hierarchy;

execute a second process in a second subdomain in the hierarchy while the first process is suspended, wherein the first and second processes are non-conflicting processes such that the second process cannot perform an action which affects the first process; and avoid a restart of the first process by resuming the first process, in response to detecting that no process that conflicts with the first process has run while the first process was suspended.

* * * * *

UNITED STATES PATENT AND TRADEMARK OFFICE
CERTIFICATE OF CORRECTION

PATENT NO. : 8,627,331 B1  
APPLICATION NO. : 12/771988  
DATED : January 7, 2014  
INVENTOR(S) : David Grunwald et al.

Page 1 of 1

It is certified that error appears in the above-identified patent and that said Letters Patent is hereby corrected as shown below:

On the Title Page, Item (56)

On page 2, in column 1, under "Other Publications", line 2, delete "11/266,859," and insert -- 11/255,859, --, therefor.

On page 2, in column 2, under "Other Publications", line 26, delete "2006," and insert -- 2005, --, therefor.

On page 2, in column 2, under "Other Publications", line 47, delete "11/255,869," and insert -- 11/255,859, --, therefor.

On page 2, in column 2, under "Other Publications", line 47, delete "2006." and insert -- 2005. --, therefor.

Signed and Sealed this  
Twentieth Day of May, 2014

Michelle K. Lee  
*Deputy Director of the United States Patent and Trademark Office*